(12) United States Patent
Matsuoka et al.

(10) Patent No.: US 9,022,353 B2
(45) Date of Patent: May 5, 2015

(54) BALL VALVE

(75) Inventors: Masashi Matsuoka, Osaka (JP);
Yosinori Shimomura, Osaka (JP);
Kunihiko Daido, Osaka (JP); Hirokatsu Maeda, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 177 days.

(21) Appl. No.: 13/580,788

(22) PCT Filed: Dec. 9, 2010

(86) PCT No.: PCT/JP2010/072103
§ 371 (c)(1),
(2), (4) Date: Sep. 26, 2012

(87) PCT Pub. No.: WO2011/104976
PCT Pub. Date: Sep. 1, 2011

(65) Prior Publication Data
US 2013/0037738 A1    Feb. 14, 2013

(30) Foreign Application Priority Data

Feb. 26, 2010    (JP) ................................. 2010-041196

(51) Int. Cl.
*F16K 5/06* (2006.01)
*F16K 27/06* (2006.01)

(52) U.S. Cl.
CPC ............. *F16K 27/067* (2013.01); *F16K 5/0668* (2013.01); *F16K 5/0636* (2013.01)

(58) Field of Classification Search
CPC ... F16K 5/0668; F16K 5/0689; F16K 5/0471; F16K 5/0271

USPC ............ 251/314, 315.01, 315.1, 315.12, 316, 251/317, 365
See application file for complete search history.

(56) References Cited

U.S. PATENT DOCUMENTS

| | | | | |
|---|---|---|---|---|
| 2,063,699 A | * | 12/1936 | Schellin | 251/317 |
| 2,373,628 A | * | 4/1945 | Gleeson | 251/315.01 |
| 3,041,036 A | * | 6/1962 | McFarland, Jr. | 251/171 |
| 3,128,987 A | * | 4/1964 | O'Connor | 251/312 |
| 3,442,490 A | * | 5/1969 | Smith | 251/317 |
| 3,948,480 A | * | 4/1976 | Paptzun et al. | 251/315.04 |

(Continued)

FOREIGN PATENT DOCUMENTS

| EP | 0014285 A1 | 8/1980 |
|---|---|---|
| JP | 43-18267 B1 | 8/1968 |

(Continued)

OTHER PUBLICATIONS

Official Letter dated Aug. 28, 2013, issued by the Chinese patent application No. 201080064817.5.

(Continued)

*Primary Examiner* — John K Fristoe, Jr.
*Assistant Examiner* — R. K. Arundale
(74) *Attorney, Agent, or Firm* — Locke Lord LLP

(57) ABSTRACT

A ball valve which can suppress the increasing of processing labor time and reliably prevent simultaneous rotation of a ball seat and a ball when the ball is rotated by handle manipulation is provided. The valve body 2 is formed of a hard material such as stainless steel, the ball seat is formed of a relatively soft material such as a fluorine resin, and a protrusion 18 is formed on a ball seat support surface 13 of the valve body 2 made of a hard material so as to bite into the ball seat 4.

3 Claims, 4 Drawing Sheets

(56) References Cited

U.S. PATENT DOCUMENTS

| | | | | |
|---|---|---|---|---|
| 4,531,710 | A | * | 7/1985 | Tort .............................. 251/167 |
| 4,709,902 | A | * | 12/1987 | Hansen ..................... 251/315.12 |
| 4,960,262 | A | * | 10/1990 | Hashimoto et al. ........ 251/315.1 |
| 5,730,420 | A | * | 3/1998 | Tow .......................... 251/315.12 |
| 7,954,788 | B2 | * | 6/2011 | Davies et al. ................. 251/365 |

FOREIGN PATENT DOCUMENTS

| | | |
|---|---|---|
| JP | 55-107012 A | 8/1980 |
| JP | 61-46021 U | 3/1986 |
| JP | 63-020139 A | 1/1988 |
| JP | 1-152148 U | 10/1989 |
| JP | 2000-046209 A | 2/2000 |
| JP | 2008-185113 A | 8/2008 |

OTHER PUBLICATIONS

International Search Report dated Jan. 25, 2011, issued for PCT/JP2010/072103.

\* cited by examiner

BALL VALVE

TECHNICAL FIELD

The present invention relates to a ball valve in which a ball is rotated to open and close the flow path, and particularly to a ball valve in which a function of preventing a ball and a ball seat from rotating together is improved.

BACKGROUND ART

Previously, a conventional ball valve that includes a valve body having a flow inlet passage, a flow outlet passage, and a communication portion formed between the passages, a ball which has a flow communication passage and is installed rotatably around a reference axis in the communication portion of the valve body, and a ball seat which has an approximately cylindrical shape with a desired opening formed on a circumferential wall and is placed between the ball and the valve body, and the flow inlet passage and the flow outlet passage are opened and closed by rotating the ball around a reference axis is well known (see Patent Document 1).

Such a ball valve has a problem that the ball seat rotates together with the ball when the ball is rotated, so that the sectional area of the passage is changed.

As a ball valve preventing such a simultaneous rotation, the ball valve in which a protrusion is formed on the bottom of the ball seat and a hole into which a protrusion is fitted is formed on a ball seat support surface of the valve body is disclosed in the Patent Document 1.

PRIOR ART DOCUMENTS

Patent Documents

Patent Document 1: Japanese Patent Application Laid-open No. 2008-185113

SUMMARY OF THE INVENTION

Problems to be Solved by the Invention

The ball valve of Patent Document 1 is excellent in that when the ball is rotated by handle manipulation, the simultaneous rotation of the ball seat and the ball can be reliably prevented. However, compared with a general conventional ball valve, it has a problem of processing labor time increasing because it is necessary to additionally process the protrusions or holes on both the ball seat and the valve body.

It is an object of the present invention to provide a ball valve which can suppress the increasing of processing labor time and reliably prevent a simultaneous rotation of a ball seat and a ball when the ball is rotated by handle manipulation.

Means for Solving the Problems

A ball valve according to the present invention includes a valve body having a flow inlet passage, a flow outlet passage, and a communication portion formed between the passages, a ball having a flow communication passage and installed rotatably around a reference axis in the communication portion of the valve body, and a ball seat having an approximately cylindrical shape with a desired opening formed on a circumferential wall and placed between the ball and the valve body, wherein the flow inlet passage and the flow outlet passage are opened and closed by rotating the ball around a reference axis, the ball seat and the valve body are made of different materials, and a protrusion is formed on the harder component between a bottom of the ball seat and a ball seat support surface of the valve body to bite into the softer component.

The ball seat may be made into one body or made into divided bodies (dually divided in an axial direction of a stem or dually divided in a direction perpendicular to the axial direction of the stem). The ball seat is received by a ball seat support surface of which a bottom is formed on a bottom wall of the valve body, and is received by a ball seat support surface of which a top surface is formed on a ball seat presser fitted into the valve body.

Different materials in the ball seat and the valve body refer to the fact that the ball seat is made of, for example, polytetrafluoroethylene (PTFE) and the valve body is made of, for example, stainless steel such as SUS316. As for the combination of materials, it may be a combination of a synthetic resin such as PTFE and a metal such as stainless steel, or a combination of a relatively hard metal such as stainless steel and a relatively soft metal such as aluminum.

Both the bottom of the ball seat and the ball seat support surface of the valve body may be of a flat surface except for the protrusion or be of an annular stepped surface except for the protrusion. The former is easier to process, and the latter has an advantage of easy centering by fitting. In either case, a recess corresponding to the protrusion is not formed on a relatively soft surface of the bottom of the ball seat or the ball seat support surface of the valve body. That is, the surface facing the protrusion is a flat surface. In the case of the stepped surface, the protrusion may be formed on an annular flat surface at a lower step, or may be formed on an annular flat surface at an upper step.

Normally, the valve body is made of a material harder than that of the ball seat, but the ball seat may be made of a material harder than that of the valve body. In the former case, a protrusion is formed on the ball seat support surface of the valve body which is relatively harder, and the bottom of the ball seat, which is relatively softer, is a flat surface with no protrusion or a stepped surface with no protrusion. In the latter case, a protrusion is formed on the bottom of the ball seat which is relatively harder, and the ball seat support surface of the valve body, which is relatively softer, is a flat surface with no protrusion or a stepped surface with no protrusion.

Preferably, the valve body is formed of a material harder than that of the ball seat and the protrusion is formed on the valve body. For example, the valve body is made of stainless steel, and the ball seat is made of a synthetic resin. As the synthetic resin, besides PTFE, a tetrafluoroethylene perfluoroalkyl vinyl ether copolymer (PFA), polyether ether ketone (PEEK), super-high molecular weight polyethylene, etc. may be used. In this way, a conventional material may be used for the ball seat, and the processing of the protrusion into the valve body can be performed in the same way as the processing frequently performed in valves other than the ball valve, whereby processing labor time can be reduced. Further, even if it becomes necessary to exchange the ball seat, it can be re-used because the protrusion of the valve body is not deformed.

The protrusion bites into a surface of the member (the ball seat or the valve body) that is formed of a relatively soft material. On the surface of the member formed of the relatively soft material, a recess corresponding to the protrusion is formed by the protrusion after assembly. With the recess formed, the member formed of the relatively soft material is deformed. However, the protrusion is made with a minute size so that most of the deformation becomes a compressive deformation. The protrusion may be, for example, an annular protrusion with a triangular cross section, but is not limited thereto. The cross section may be a rectangular or circular arc shape, or in such a shape that a plurality of protrusions are placed in a circumferential direction at predetermined intervals. It may be in such a shape that a cutout is formed in a predetermined place (one or more places) in the circumferential direction of the annular protrusion. Normally, the annular protrusion is made in a cylindrical shape, but the annular protrusion may be made in an oval shape rather than a complete circle. Normally, the protrusion is integrally formed with the ball seat or the valve body, but when formed in the valve body, a slot or a blind hole is formed in the valve body, and a protrusion of a separate member may be fitted into this slot or the blind hole.

Preferably, the protrusion is of a cylindrical shape and is cut off in at least one place. Considering that the processing of the protrusion is to be reduced, it is preferable to make the protrusion in a cylindrical shape. In this case, however, when the ball has rotated, the ball seat is likely to slide along the protrusion as a rail. Therefore, a simple process of cutting out a predetermined place of the protrusion is carried out additionally so as to form a stepped portion (a relatively recessed place) in a predetermined place in the circumferential direction of the protrusion. Thus, it is preferable that a part of a member formed of a relatively softer material be fitted into this stepped portion so as to increase the resistance force against the movement in the rotational direction (the circumferential direction). The number of cutouts is preferably a plural number, for example four, but it is not limited thereto as long as it is a plural number.

The cutout may have a triangular, rectangular or circular arc shape as seen from outside in the radial direction. The triangular cutout may be V-shaped (isosceles triangle) or ∠-shaped (right triangle). The cutout may be formed by removing at least a part of a topmost end portion of the protrusion, and thus the cutout may have such a shape in which only a part (including the topmost end portion) of the protrusion is removed, rather than the shape in which the whole of the protrusion is removed in the radial direction.

In addition, the top surface of the ball seat may have the same configuration as mentioned above. That is, the ball seat and ball seat presser are made of different materials, and a protrusion is formed on the harder component between the top surface of the ball seat and the ball seat support surface of the ball seat presser to bite into the softer component.

Advantageous Effects of the Invention

According to the ball valve of the present invention, since a protrusion is formed on the harder component between a bottom of the ball seat and a ball seat support surface of the valve body to bite into the softer component, the simultaneous rotation of the ball seat and the ball when the ball is rotated around the reference axis is reliably prevented by the bite of the protrusion, and the change in the passage cross section is prevented, so that it is possible to obtain a ball valve with the flow rate that is stable over a long period. In addition, since it is not necessary to process a recess corresponding to the protrusion, additional processing is only for the protrusion, so that it is possible to suppress the increase of processing labor time compared with a conventional ball valve.

Figure 1:
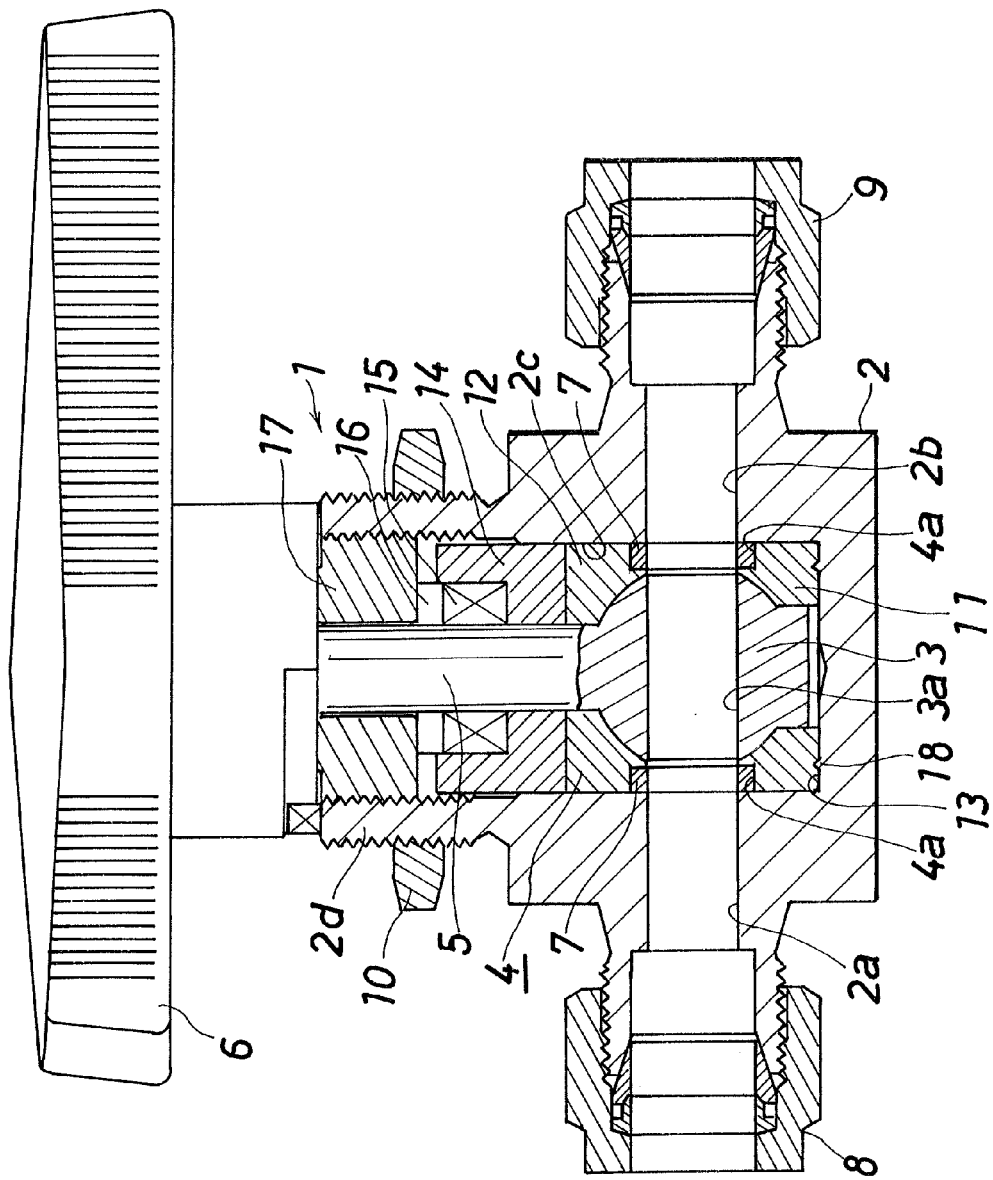
FIG. 1 is a front cross-sectional view showing a first embodiment of a ball valve according to the present invention.
Figure 2:
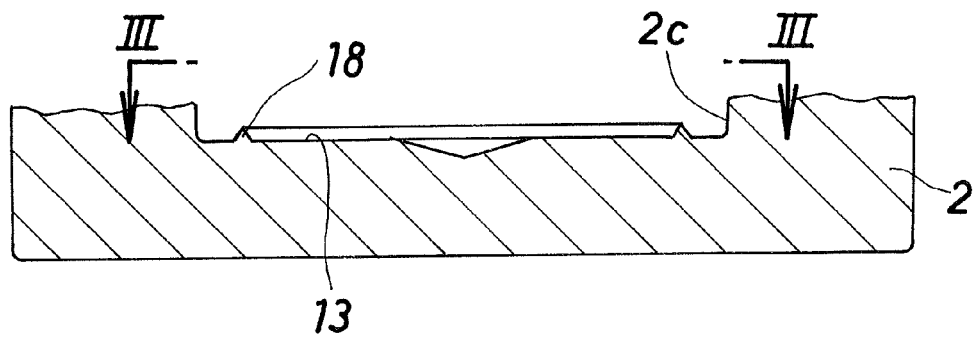
FIG. 2 is an enlarged front cross-sectional view showing a ball seat support surface of a valve body.
Figure 3:
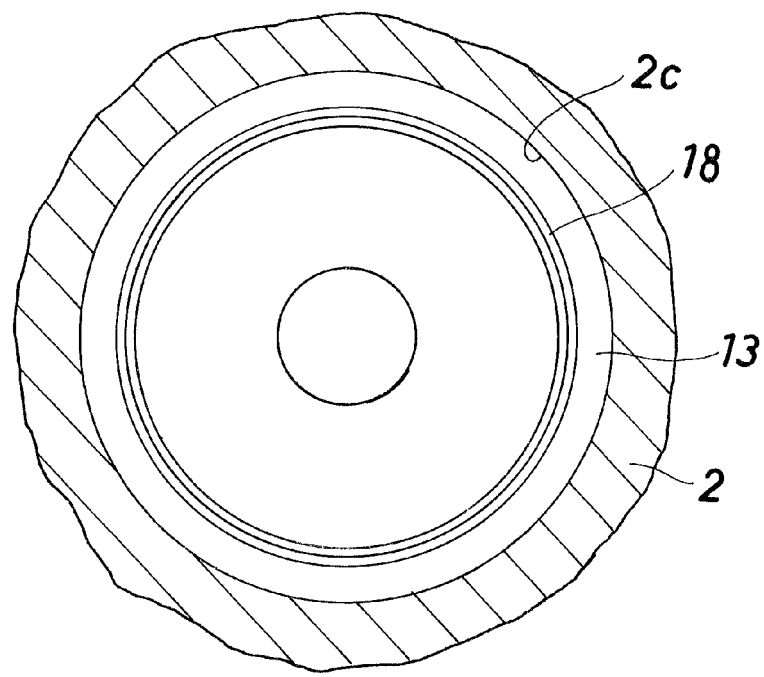
FIG. 3 is a cross-sectional view taken along line III-III of FIG. 2 showing the ball seat support surface of the valve body.

EXPLANATION OF REFERENCE SIGNS (1): ball valve
(2): valve body
(2a): flow inlet passage
(2b): flow outlet passage
(2c): communication portion
(3): ball
(3a): flow communication passage
(4): ball seat
(4a)(4b): opening
(13): ball seat support surface
(18): protrusion
(19): protrusion
(20): cutout

MODES FOR CARRYING OUT THE INVENTION

Hereinafter, exemplary embodiments of the present invention will be described with reference to the accompanying drawings. In the description below, top, bottom, left and right refer to the top, bottom, left and right as shown in FIG. 1. These directions are used for the sake of convenience, and in actual mounting, the top to bottom direction may be not only a vertical direction but also a horizontal direction.

FIGS. 1 to 4 show a first embodiment of a ball valve (1) according to the present invention. The ball valve (1) has two ports, and includes a valve body (2) which has a flow inlet passage (2a), a flow outlet passage (2b) and a communication portion (2c) formed between the passages (2a) and (2b), a ball (3) which has a flow communication passage (3a) and is placed rotatably around a reference axis (the axis in the vertical direction) in the communication portion (2c) of the valve body (2), a ball seat (4) which has an approximately cylindrical shape with a desired opening (4a) formed on the circumferential wall and is closely placed between the ball (3) and the valve body (2), a stem (5) which is integrally formed with the ball (3), a handle (6) which is installed at the top end portion of the stem (5), and a retainer (7) which is fitted into the opening (4a) formed in the ball seat (4).

The valve body (2), the ball (3), the stem (5) and the retainer (7) are made of stainless steel, the ball seat (4) is made of a fluorine resin, and the handle (6) is made of brass casting and nylon 6.

In the inlet portion of the flow inlet passage (2a) of the valve body (2), a connecting portion (8) for connecting an inlet pipe is formed, and in the outlet portion of the flow outlet passage (2b) of the valve body (2), a connecting portion (9) for connecting an outlet pipe is formed. The valve body (2) has a cylindrical portion (2d) that protrudes upward, and a panel nut 10 is screwed to a screw portion formed on the cylindrical portion (2d).

FIG. 1 shows a state in which the flow inlet passage (2a) and the flow outlet passage (2b) communicate through the flow communication passage (3a) of the ball (3). Although not shown in the drawings, by rotating the ball (3) around the reference axis in this state so as to make the flow communication passage (3a) face the direction from the front to the back of the paper in FIG. 1, the communication of the flow inlet passage (2a) and the flow outlet passage (2b) is closed off.

Figure 4:
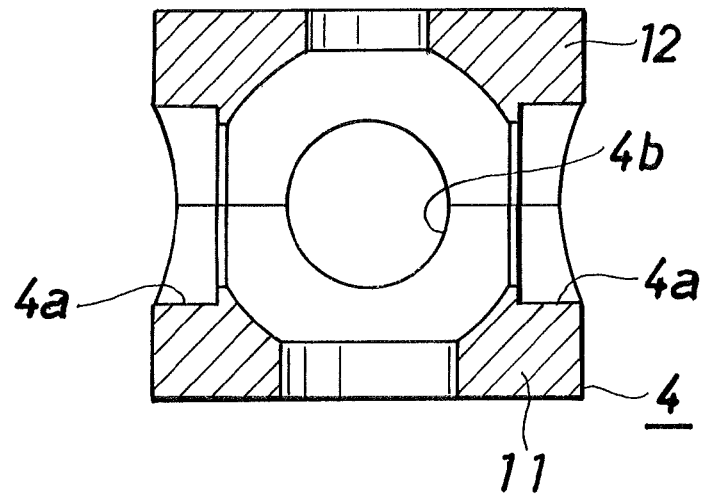
FIG. 4 is an enlarged front cross-sectional view showing a ball seat.

The ball seat (4) is divided into an upper and lower as shown in FIG. 4, and a lower half part (11) and an upper half part (12) with a shape similar to the lower half part abut each other, so that the ball seat is formed in an approximately cylindrical shape capable of accommodating the ball (3). The bottom of the lower half part (11) is supported by a ball seat support surface (13) which defines the bottom of the flow communication passage (3a) of the valve body (2), and the top surface of the upper half part (12) is supported by the bottom of a ball seat presser (14).

The ball seat presser (14) is made of stainless steel, and is fitted into the cylindrical portion (2d) of the valve body (2). In the upper portion of the ball seat presser (14), a fluorine resin packing (15) which seals between the stem (5) and the cylindrical portion (2d) of the valve body (2) is maintained. The packing (15) is pressed downward by a packing presser screw (17) screwed to the inner circumference of the cylindrical portion (2d) of the valve body (2) through a packing presser (16). The tightening force of the packing presser screw (17) is adjusted, so that the ball seat (4) is maintained between the ball seat presser (14) and the ball seat support surface (13).

On the circumferential wall of the ball seat (4), a total of four openings (4a) and (4b) are formed at equal intervals, and in the left and right openings (4a) shown in FIG. 1, retainers (7) having approximately cylindrical shapes are fitted. By these retainers (7), opening is ensured for flow passage and deformation of the ball seat (4) is suppressed. In the front and back opening (4b) (see FIG. 4) of the ball seat (4), a retainer (not shown) having a cylindrical shape for closing the opening (4b) is fitted in order to be used as the ball valve (1) of two ports.

A protrusion (18) having a cylindrical shape which can bite into the bottom of the ball seat (4) (the lower surface of the lower half part (11) of the ball seat (4)) and having a triangular cross-section is formed on the ball seat support surface (13) of the valve body (2) (that is, the hard component between the bottom of the ball seat (4) and the ball seat support surface (13) of the valve body (2)). The bottom of the ball seat (4) has a flat surface as shown in FIG. 4 before assembly, and as shown in FIG. 1, the protrusion (18) bites into the bottom of the ball seat (4) in an assembled state.

As specific materials and dimensions, the valve body (2) is made of SUS316, the ball seat (4) is made of PTFE, the thicknesses (vertical dimensions) of the halves (11) and (12) of the ball seat (4) are 6.5 mm, and the height of the protrusion (18) is 0.3 mm.

In the embodiment described above, the protrusion (18) has a cylindrical shape, and thus is easy to process. Meanwhile, when the ball (3) rotates, because the ball seat (4) is apt to rotate together with the ball (3), it is preferable that the protrusion not have a cylindrical shape. For example, the protrusion may have an elliptical round shape, and a cone-shaped protrusion may be formed circumferentially at a predetermined interval.

Figure 5:
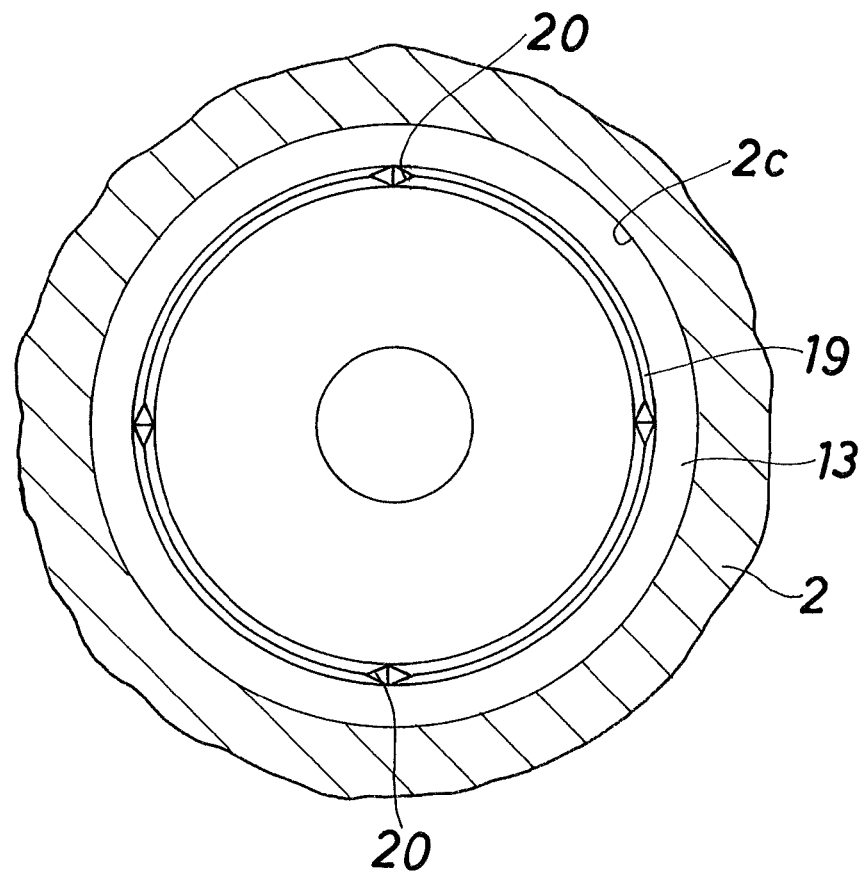
FIG. 5 is a cross-sectional view showing another embodiment of the ball seat support surface of the valve body, which corresponds to FIG. 3.

As a preferable example, an annular protrusion (19) is cut out at predetermined places (four places in FIG. 5), as shown in FIG. 5. Here the cutout (20) as seen from outside in the radial direction has a V shape as shown in FIG. 6(a).

Thereby, the rotation is also prevented because the bottom of the ball seat (4) is caught by the cutouts (20) formed in the protrusion (19). The cutout (20) is formed easily by press processing, etc. and can greatly enhance the simultaneous rotation prevention effect.

Figure 6:
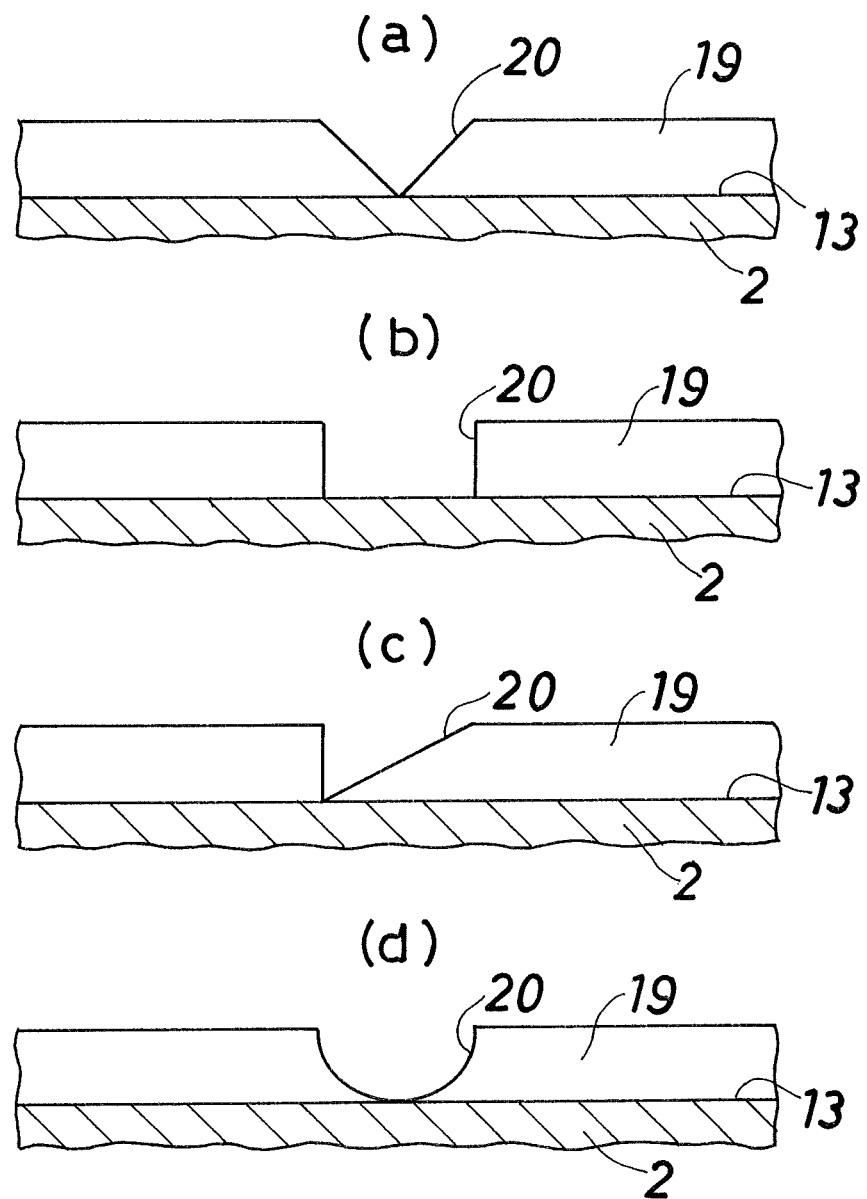
FIG. 6(a) is a view showing the same part shown in FIG. 5 as seen from outside of the radial direction.
FIG. 6(b) to (d) are views showing modification examples of cutouts in another embodiment.

The shape of the cutout (20) as seen from outside in the radial direction is not limited to the V shape (isosceles triangle). For example, the cutout may be rectangular as shown in FIG. 6(b), or have a ∠ shape (right triangle) as shown in FIG. 6(c) or circular arc shape as shown in FIG. 6(d). In FIG. 6, the bottom of each cutout (20) is level with the ball seat support surface (13) of the valve body (2), but the bottom of each cutout (20) may be positioned above the ball seat support surface (13) of the valve body (2) (each cutout (20) may be formed more shallowly than that shown in drawing). Of course, the number of the cutouts (20) is not limited to four.

While the ball seat (4) is shown above as being divided into a top and bottom, it may be one approximately cylindrical member and may be split into a left and right instead of a top and bottom. The bottom of the ball seat (4) is made as a flat surface without steps, but may also be an annular stepped surface. In this case, the ball seat support surface (13) of the valve body (2) is made as a stepped surface to correspond thereto. The protrusions (18) and (19) may be formed in the top end portion of the stepped surface or the bottom end portion thereof. The processing of such a stepped surface does not significantly increase labor time, and as described above, the cutout is easily processed by press processing or the like and can greatly enhance the simultaneous rotation prevention effect.

INDUSTRIAL APPLICABILITY

According to the present invention, in the ball valve which opens and closes the flow passage by rotating the ball, the function of preventing the simultaneous rotation of the ball and the ball seat can be improved by rotating the ball. Further, it can contribute to the performance improvement of the ball valve, since it can suppress the increase of labor time in the processing of the ball valve.

The invention claimed is:

1. A ball valve that comprises a valve body having a flow inlet passage, a flow outlet passage, and a communication portion formed between the passages, a ball having a flow communication passage and installed rotatably around a reference axis in the communication portion of the valve body, and a ball seat having an approximately cylindrical shape with a desired opening formed on a circumferential wall and placed between the ball and the valve body, wherein the flow inlet passage and the flow outlet passage are opened and closed by rotating the ball around a reference axis, the ball seat and the valve body are made of different materials, a cylindrical shaped protrusion, a leading edge of which forms a circle, is formed on the harder component between a bottom of the ball seat and a ball seat support surface of the valve body to bite into the softer component, and the protrusion is cut off in at least one place on the leading edge and a surface of the softer component facing the protrusion is a flat surface, wherein in an upper portion of the ball seat presser, a packing is maintained, the packing is pressed downward by a packing presser screw screwed to inner circumference of a cylindrical portion of the valve body through a packing presser, and tightening force of the packing presser screw is adjusted, so that the ball seat is maintained between the ball seat presser and the ball seat support surface.

2. The ball valve according to claim 1, wherein the protrusion is cut off in a shape selected from a group consisting of a rectangular, a ∠-shape, and a circular arc.

3. A ball valve that comprises a valve body having a flow inlet passage, a flow outlet passage, and a communication portion formed between the passages, a ball having a flow communication passage and installed rotatably around a reference axis in the communication portion of the valve body, and a ball seat having an approximately cylindrical shape with a desired opening formed on a circumferential wall and placed between the ball and the valve body, wherein the flow inlet passage and the flow outlet passage are opened and closed by rotating the ball around a reference axis, the ball seat and the valve body are made of different materials, a cylindrical shaped protrusion, a leading edge of which forms a circle, is formed on the harder component between a bottom of the ball seat and a ball seat support surface of the valve body to bite into the softer component, and the protrusion is cut off in at least one place on the leading edge and a surface of the softer component facing the protrusion is a flat surface, wherein the ball seat is divided into an upper and a lower half parts, a bottom of the lower half part is supported by a ball seat support surface which defines a bottom surface of the flow communication passage of the valve body, and a top surface of the upper half part is supported by a bottom of a ball seat presser, and wherein in an upper portion of the ball seat presser, a packing is maintained, the packing is pressed downward by a packing presser screw screwed to inner circumference of a cylindrical portion of the valve body through a packing presser, and tightening force of the packing presser screw is adjusted, so that the ball seat is maintained between the ball seat presser and the ball seat support surface.

* * * * *